United States Patent
Su et al.

(10) Patent No.: US 11,035,691 B2
(45) Date of Patent: Jun. 15, 2021

(54) NAVIGATION METHOD AND NAVIGATION SYSTEM

(71) Applicant: KWANG YANG MOTOR CO., LTD., Kaohsiung (TW)

(72) Inventors: Ping-Chen Su, Taipei (TW); Te-Chuan Liu, Taipei (TW); Chen-Sheng Lin, Kaohsiung (TW); Yi-Yang Tsai, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 255 days.

(21) Appl. No.: 16/262,673

(22) Filed: Jan. 30, 2019

(65) Prior Publication Data
US 2019/0250007 A1    Aug. 15, 2019

(30) Foreign Application Priority Data
Feb. 9, 2018    (TW) ................................ 107104614

(51) Int. Cl.
G01C 21/36    (2006.01)
G01C 21/14    (2006.01)
G01C 21/26    (2006.01)

(52) U.S. Cl.
CPC .......... *G01C 21/367* (2013.01); *G01C 21/14* (2013.01); *G01C 21/26* (2013.01); *G01C 21/362* (2013.01); *G01C 21/3676* (2013.01); *G01C 21/3688* (2013.01)

(58) Field of Classification Search
CPC .... G01C 21/367; G01C 21/362; G01C 21/26; G01C 21/3688; G01C 21/14; G01C 21/3676; G01C 21/28
See application file for complete search history.

(56) References Cited

U.S. PATENT DOCUMENTS

2002/0198658 A1 * 12/2002 Tanaka .................. G01C 21/28
                                                               701/472

FOREIGN PATENT DOCUMENTS

DE      10 2005 001399 A1 *   7/2006  ............. G01C 21/28

* cited by examiner

*Primary Examiner* — Brian P Sweeney
(74) *Attorney, Agent, or Firm* — Womble Bond Dickinson (US) LLP

(57) ABSTRACT

A navigation method includes steps of: repeatedly emitting, by a wheel speed sensor, a pulse signal to a processor of a vehicle when the vehicle starts to travel from a start point of a route of a map; in response to receipt of a preset number of the pulse signals transmitting, by the processor, the preset number of the pulse signals to a portable device; calculating, by the portable device, a current position of the vehicle on the map based on a distance associated with the preset number of the pulse signals; and transmitting, by the portable device, data of the map having the current position to the processor so as to display the same.

10 Claims, 6 Drawing Sheets

NAVIGATION METHOD AND NAVIGATION SYSTEM

CROSS-REFERENCE TO RELATED APPLICATION

This application claims priority to Taiwanese Patent Application No. 107104614 filed on Feb. 9, 2018.

FIELD

The disclosure relates to a navigation method and a navigation system, and more particularly to a navigation system and a navigation method utilizing traveling data of a vehicle.

BACKGROUND

Global positioning system (GPS) navigation devices are widely used nowadays when driving a vehicle. However, a position of the vehicle obtained by a GPS navigation device may be inaccurate and may deviate from an actual position of the vehicle for up to twenty meters.

SUMMARY

Therefore, an object of the disclosure is to provide a relatively accurate or precise navigation method and a navigation system.

According to one aspect of the disclosure, a navigation method to be implemented by a portable device and a vehicle is provided. The vehicle includes a wheel speed sensor and an instrument cluster device communicatively connected to the wheel speed sensor and the portable device. The navigation method includes steps of:

repeatedly emitting, by the wheel speed sensor, a pulse signal to the instrument cluster device when the vehicle starts to travel from a start point of a navigation route on a navigation map;

in response to receipt of a preset number of the pulse signals, transmitting, by the instrument cluster device, an indication signal associated with the preset number of the pulse signals to the portable device;

upon receipt of the indication signal, calculating, by the portable device, a current position of the vehicle on the navigation map based on a predetermined distance that is related to the preset number of the pulse signals;

transmitting, by the portable device, data of the navigation map having the current position of the vehicle and the navigation route to the instrument cluster device; and in response to receipt of the data, displaying, by the instrument cluster device, the navigation map having the current position of the vehicle and the navigation route.

According to another aspect of the disclosure, a navigation system for navigating a vehicle is provided.

The navigation system includes a portable device, a wheel speed sensor, and an instrument cluster device.

The wheel speed sensor is configured to be mounted on the vehicle and to repeatedly emit a pulse signal when the vehicle starts to travel from a start point of a navigation route on a navigation map. The instrument cluster device is configured to be mounted on the vehicle, is communicatively connected to the portable device, is electrically connected to the wheel speed sensor for receiving the pulse signals therefrom, and is configured to, in response to receipt of a preset number of the pulse signals, and transmit an indication signal associated with the preset number of the pulse signals. The portable device is configured to, upon receipt of the indication signal, calculate a current position of the vehicle on the navigation map based on a predetermined distance that is related to the preset number of the pulse signals, and to transmit data of the navigation map having the current position of the vehicle and the navigation route to the instrument cluster device. In response to receipt of the data, the instrument cluster device is further configured to display the navigation map having the current position of the vehicle and the navigation route.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
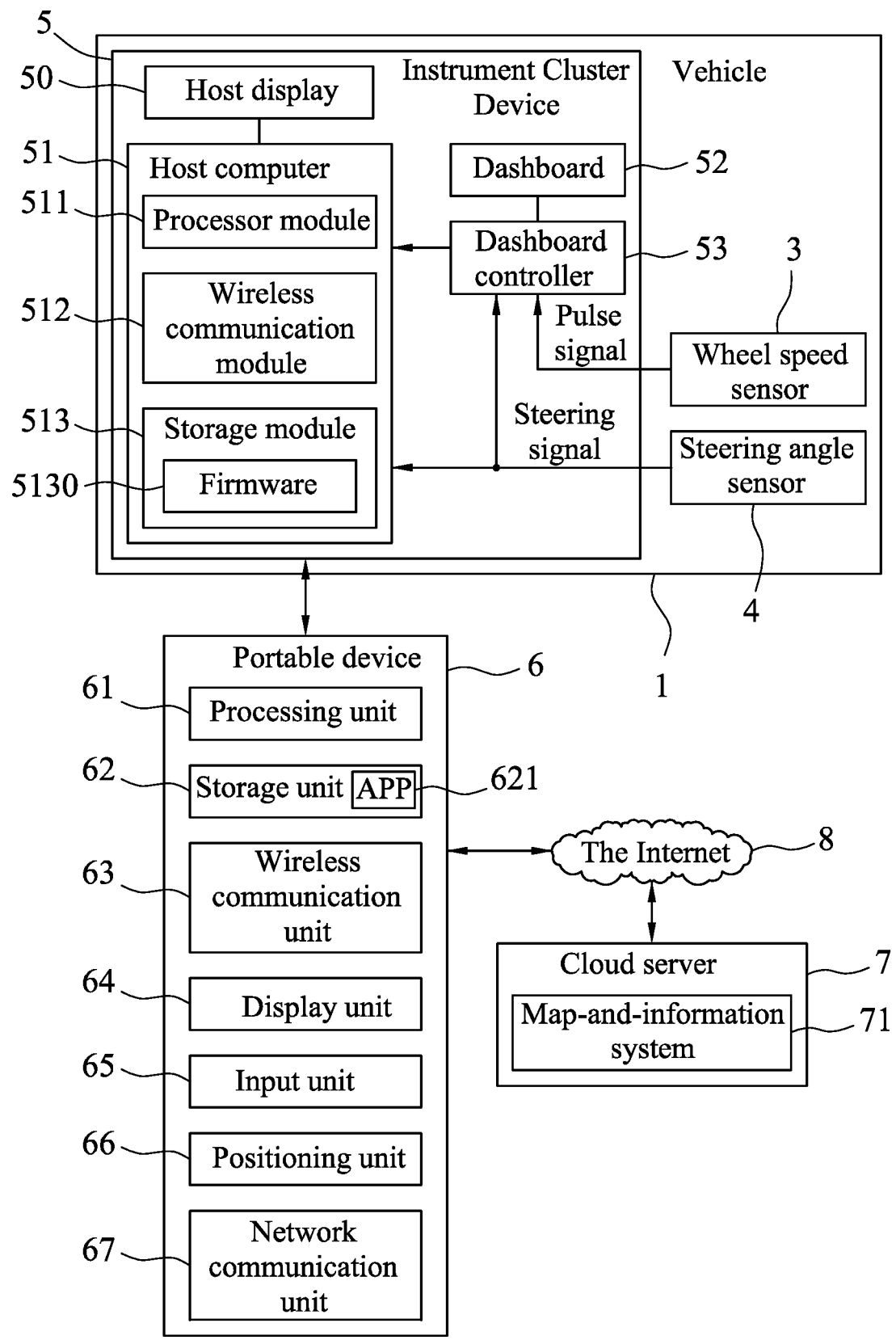
FIG. 1 is schematic block diagram of a navigation system according to one embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
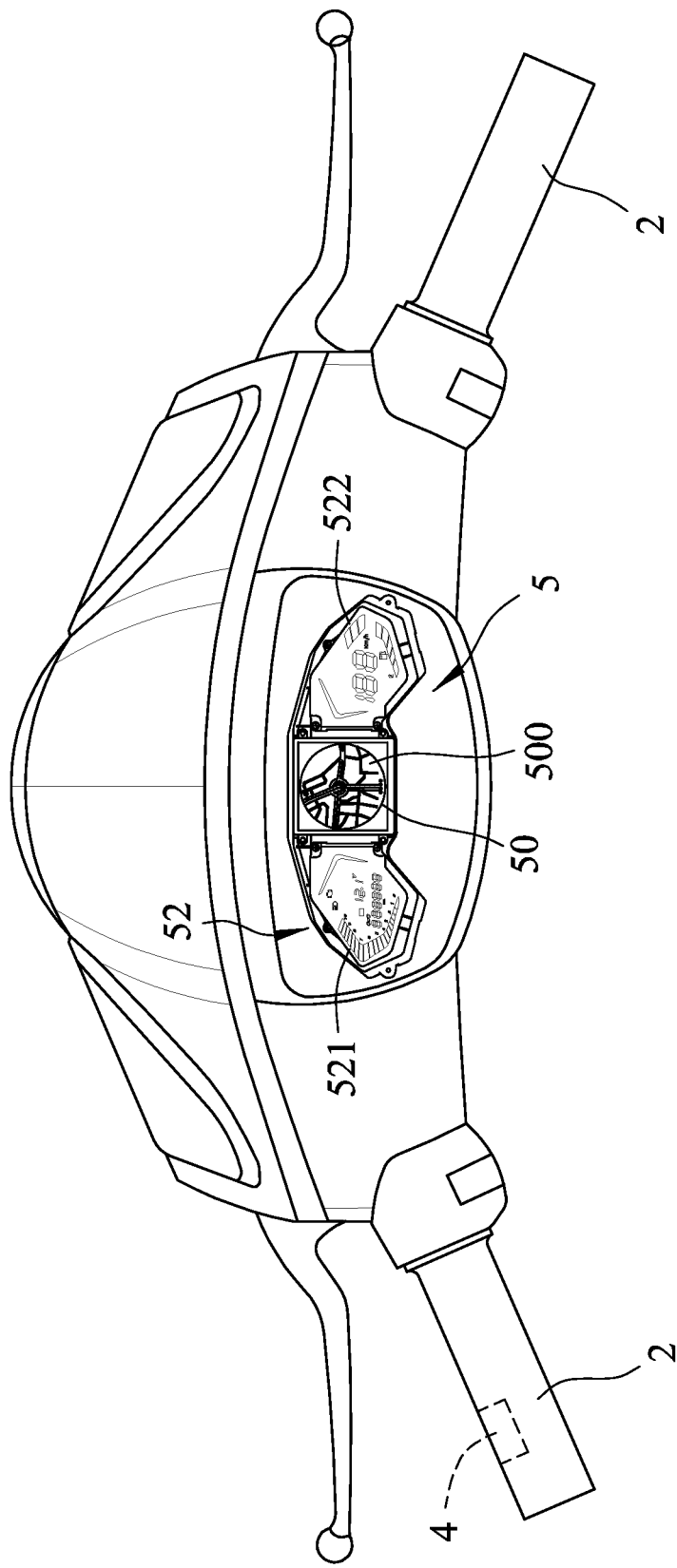
FIG. 2 is a schematic view illustrating an instrument cluster device of the navigation system including a host display and a dashboard.

Referring to FIGS. 1 and 2, a navigation system for navigating a vehicle 1 is provided. The vehicle 1 can be an automobile, a scooter, an all terrain vehicle (ATV), a utility vehicle (UV), an electric vehicle, or any transportation carrier. In this embodiment, the vehicle 1 is a scooter but the disclosure is not limited in this aspect.

The vehicle 1 includes a handgrip 2, a wheel speed sensor 3, a steering angle sensor 4 and an instrument cluster device 5. In this embodiment, the navigation system for navigating the vehicle 1 includes the wheel speed sensor 3, the steering angle sensor 4, the instrument cluster device 5 and a portable device 6. The portable device 6 is communicatively connected to the instrument cluster device 5.

The wheel speed sensor 3 is electrically connected to the instrument cluster device 5, is mounted, for example, on a wheel of the vehicle 1, and is to repeatedly emit a pulse signal when the vehicle 1 starts to travel from a start point of a navigation route on a navigation map. The navigation route is determined by the portable device 6 based on the start point and a destination point selected by a user of the portable device 6. In some embodiments, the wheel speed sensor 3 may be implemented using a Hall effect sensor, but the present disclosure is not limited in this respect.

The steering angle sensor 4 is mounted on the handgrip 2, is electrically connected to the instrument cluster device 5, and is configured to transmit a steering signal related to a steering angle of the handgrip 2 to the instrument cluster device 5. In this embodiment, the steering angle sensor 4 is an accelerometer for detecting acceleration of the handgrip 2, and the steering signal indicating the steering angle of the handgrip 2.

In this embodiment, the instrument cluster device 5 includes a host display 50, a host computer 51, a dashboard 52 and a dashboard controller 53. The host computer 51 is electrically connected to the host display 50 for controlling operation of the host display 50. The dashboard controller 53 is electrically connected to the host computer 51 and the dashboard 52, and is electrically connected to the wheel speed sensor 3 for receiving the pulse signals therefrom. The pulse signals are then transmitted to the host computer 51 through the dashboard controller 53. In this embodiment, the steering angle sensor 4 is electrically connected to the host computer 51 and the dashboard controller 53 for transmitting the steering signal to both the host computer 51 and the dashboard controller 53.

The dashboard 52 is configured to display specific information in a dedicated format, which is set by a manufacturer of the vehicle 1, and is not arbitrarily alterable as desired by a user. The dashboard controller 53 is configured to control display of the dashboard 52. In this embodiment, the dashboard 52 (see FIG. 2) includes a first part 521 and a second part 522 that are arranged respectively at left and right sides of the host display 50, and is particularly configured for displaying instrument cluster information such as an accumulated traveling distance of the vehicle 1, a current speed of the vehicle 1, a current fuel level, a voltage of the battery, etc., in predefined formats and arrangements.

On the other hand, the host display 50 is configured as an ordinary display, such as a regular LCD, that is used to display an image based on any arbitrary image data provided by the host computer 51. The host computer 51 can be operated by a user through some buttons (not shown) to operate in a displaying mode or a connection mode. In the connection mode, the host computer 51 is capable of pairing with and/or connecting to the portable device 6 wiredly or wirelessly so that the host computer 51 can receive data from the portable device 6, and control the host display 50 to display images based on data received from the portable device 6, such as vehicle speed, current time, weather, intelligent compass, notifications, vehicle finding, etc. When the host computer 51 operates in the displaying mode, the host computer 51 controls the host display 50 to display instrument cluster information, for example, the accumulated traveling distance of the vehicle 1, a traveling distance of an individual trip, a distance to empty, the tire pressures, the current voltage of the battery, etc.

The host computer 51 includes a processor module 511, a wireless communication module 512 and a storage module 513 for storing data, such as program data 5130 (e.g., an operating system (OS), firmware (FW)), and application programs of the host computer 51. The processor module 511 is electrically connected to the host display 50, the wireless communication module 512 and the storage module 513. In this embodiment, the host display 50 is a liquid crystal display (LCD) and the wireless communication module 512 is for example a Bluetooth module, a Wi-Fi module or a near-field communication (NFC) module.

In this embodiment, the portable device 6 is a mobile phone (e.g., a smartphone) capable of accessing a map-and-information system 71 stored in a cloud server via the Internet 8, and performing navigation function according to the map-and-information system 71. In other embodiments, the portable device 6 can be a personal digital assistant (PDA), a smart watch, a tablet computer, or the like, and the present disclosure is not limited in this respect. In this embodiment, the portable device 6 includes a processor unit 61, a storage unit 62 storing an application program (APP) 621, a wireless communication unit 63, a display unit 64, an input unit 65, a positioning unit 66, and a network communication unit 67. The positioning unit 66 is a positioning device capable of receiving information from, for example, the global positioning system (GPS).

Note that each of the terms "storage unit" and "storage module", or the like throughout the specification may refer to or include any non-transitory memory mechanism, such as read-only memory (ROM), non-transitory random-access memory (NVRAM), magnetic disk storage medium, optical storage medium, flash memory, solid state devices (SSD), or other storage devices and media. Each of the terms "controller", "processor module" and "processor unit" and the like throughout the specification may refer to any device or portion of a device that processes electronic data from registers and/or memory to transform that electronic data into other electronic data. For example, each of the dashboard controller 53, the processor module 511 and the processor unit 61 may refer to or include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The wireless communication unit 63 is wirelessly connected to the wireless communication module 512 of the host computer 51. The wireless communication unit and the wireless communication module 512 communicate with each other using the same wireless transmission protocol. For example, when the wireless communication module 512 uses a wireless technology of Bluetooth®, the wireless communication unit 63 also uses the wireless technology of Bluetooth® to communicate with the wireless communication module 512.

In this embodiment, the display unit 64 and the input unit 65 are integrated as a touchscreen that displays a control interface of the APP 621 when the APP 621 is executed by the processor unit 61 so as to allow user operation.

Figure 3:
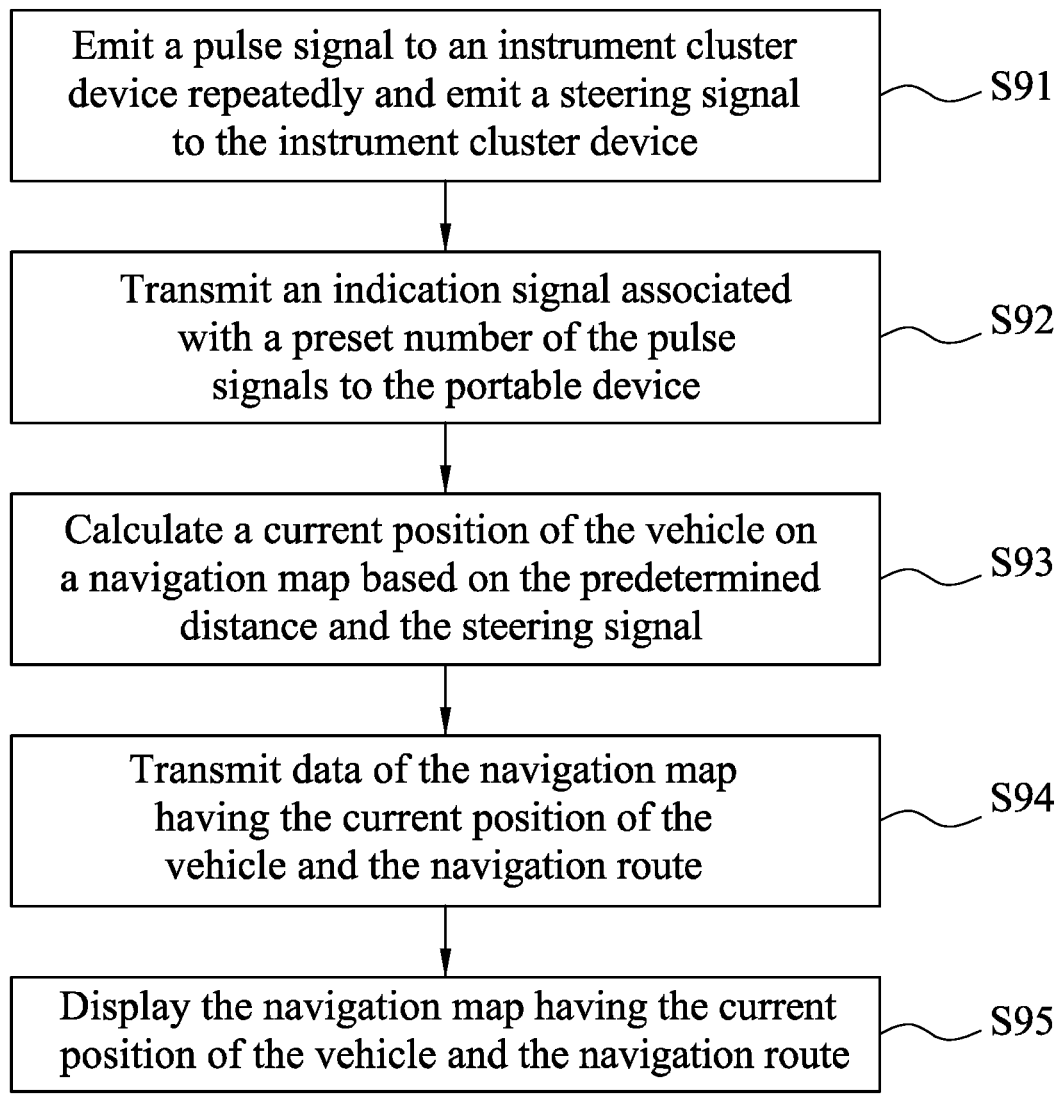
FIG. 3 is a flowchart of a navigation method according one embodiment of this disclosure.

Further referring to FIG. 3, a navigation method to be implemented by the navigation system and the vehicle 1 according to one embodiment of the present disclosure is shown. Before performing the navigation method, the host computer 51 is operated in the connection mode and is thus communicatively connected to the portable device 6 to receive the navigation route determined by the portable device 6. The navigation method includes the following steps.

In step S91, the wheel speed sensor 3 repeatedly emits a pulse signal to the instrument cluster device 5 once the vehicle 1 starts to travel from the start point of the navigation route on the navigation map, and the steering angle sensor 4 emits a steering signal related to a steering angle of the handgrip 2 of the vehicle 1 to the instrument cluster device 5 when the handgrip 2 is turned.

In step S92, in response to receipt of a preset number of the pulse signals, the processor module 511 of the instrument cluster device 5 transmits an indication signal associated with the preset number of the pulse signals and the steering signal to the portable device 6 through the wireless communication module 512. For example, in a case that the wheel speed sensor 3 emits one pulse signal to the processor module 511 of the instrument cluster device 5 each time the vehicle travels forward ten centimeters and the preset number is ten, the indication signal is transmitted by the processor module 511 to the portable device 6 each time the vehicle 1 travels one meter (predetermined distance) forward. In this way, movement estimation for the vehicle 1 on the navigation route can have a precision of one meter, which is much better than movement estimation obtained utilizing only GPS navigation devices, usually having a precision ranging from five meters to twenty meters.

In step S93, upon receipt of the indication signal, the processor unit 61 of the portable device 6 calculates a current position of the vehicle 1 on the navigation map based on a predetermined distance and the steering angle indicated by the steering signal. The predetermined distance is related to the preset number of the pulse signals, and is one meter in this embodiment.

Regarding the steering angle of the handgrip 2, the handgrip 2 may be steered by a rider/driver of the vehicle 1 based on road conditions and the vehicle 1 may deviate from a centerline of the navigation route when traveling along the navigation route. It is beneficial to take the steering angle of the handgrip 2 into account when the processor module 511 estimates a current position of the vehicle 1 to thereby improve the accuracy of movement estimation for the vehicle 1. More specifically, while a distance travelled by the vehicle 1 may be the predetermined distance, a distance between the current position of the vehicle 1 and the start point on the navigation route may be shorter than the predetermined distance since the vehicle 1 may not follow the navigation route perfectly without any deviations due to variations in the orientation of the vehicle 1 while traveling.

In step S94, the wireless communication unit 63 of the portable device 6 transmits data related to the navigation map having the current position of the vehicle 1 and the navigation route to the wireless communication module 512 of the instrument cluster device 5.

In step S96, upon receipt of the data related to the navigation map having the current position of the vehicle 1 and the navigation route via the communication module 512, the processor module 511 controls the host display 50 of the instrument cluster device 5 to display the navigation map 500 having the current position of the vehicle 1 and the navigation route as shown in FIG. 2.

Figure 4:
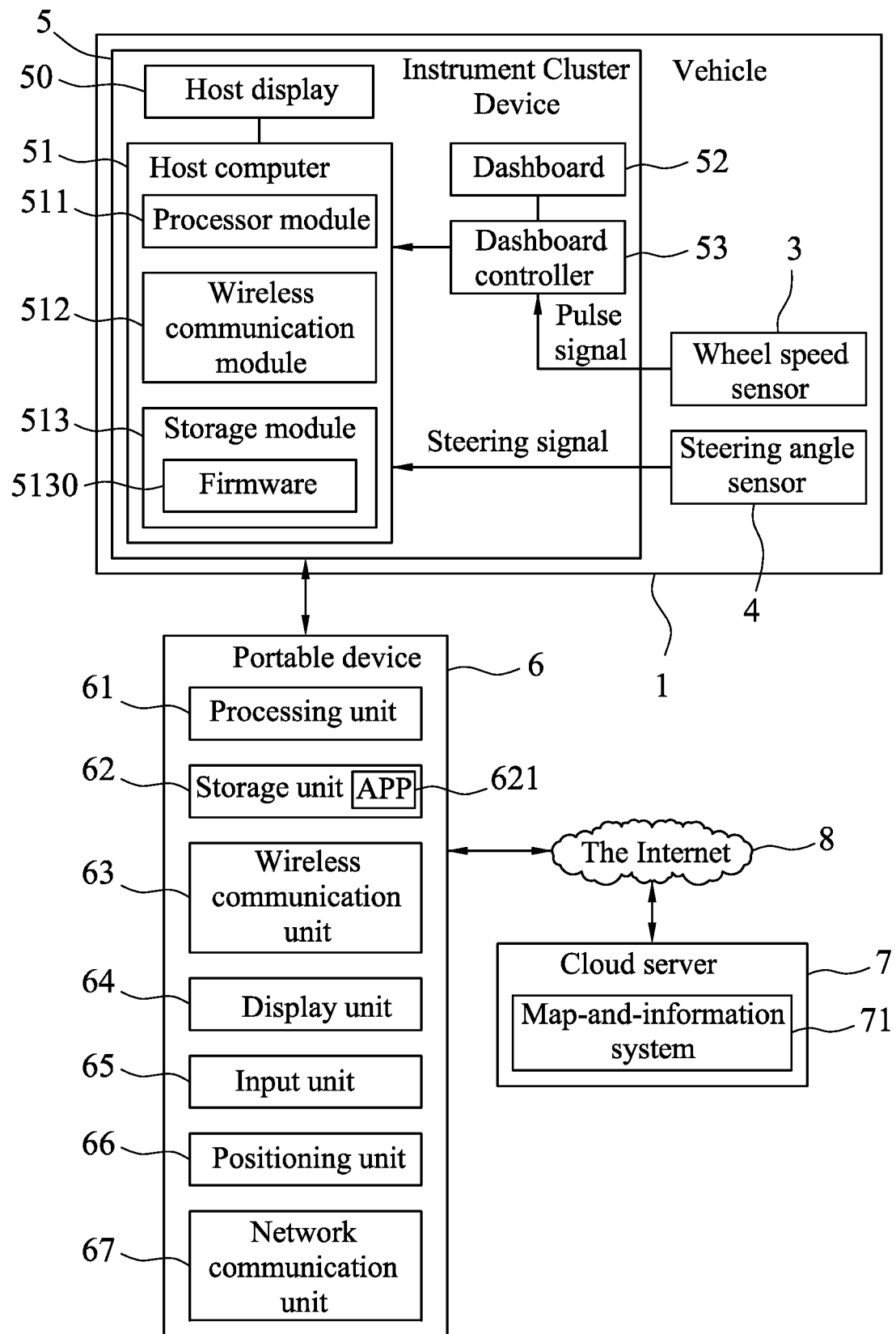
FIG. 4 is a schematic block diagram of a modification of the navigation system according to one embodiment of the present disclosure.

Referring to FIG. 4, a modification of the navigation system is shown. In this example, the dashboard controller 53 is electrically connected only to the wheel speed sensor 3 for receiving the pulse signals therefrom. The host computer 51 is electrically connected to the steering angle sensor 4 for receiving the steering signal therefrom, and is electrically connected to the dashboard controller 53. In this way, the steering signal from the steering angle sensor 4 is transmitted only to the host computer 51, and the pulse signals are received by the dashboard controller 53 and are then transmitted to the host computer 51. Subsequently, the processor module 511 of the host computer 51 transmits the indication signal and the steering signal through the wireless communication module 512 to the portable device 6 for use in subsequent calculations performed by the portable device 6.

Figure 5:
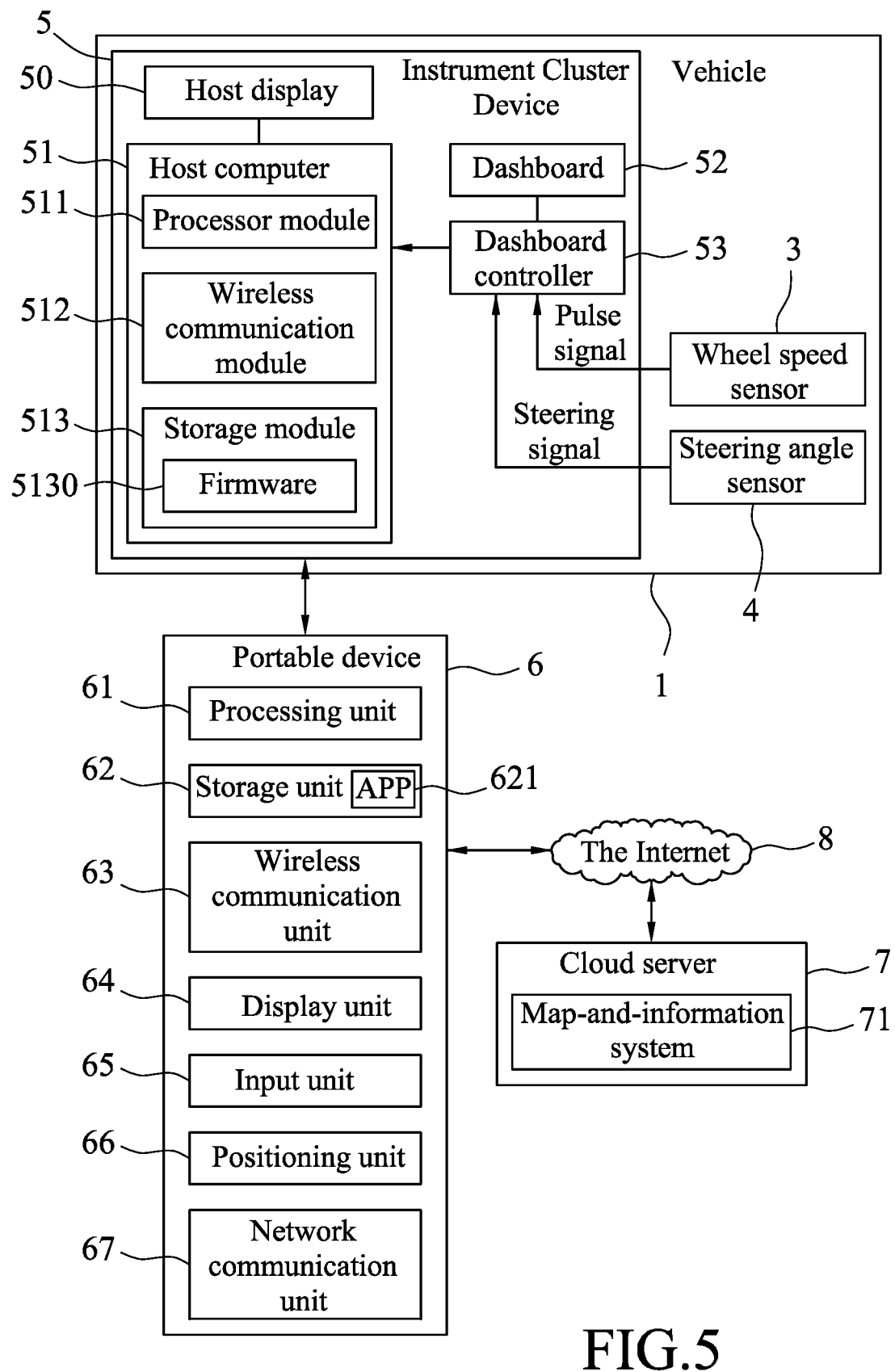
FIG. 5 is a schematic block diagram of another modification of the navigation system according to one embodiment of the present disclosure.

Referring to FIG. 5, another modification of the navigation system is shown. In this example, the dashboard controller 53 is electrically connected to the wheel speed sensor 3 for receiving the pulse signals therefrom, and is electrically connected to the steering angle sensor 4 for receiving the steering signal therefrom. The host computer 51 is electrically connected to the dashboard controller 53 for receiving the pulse signals and the steering signal received by the dashboard controller 53 from the dashboard controller 53. Subsequently, the processor module 511 of the host computer 51 transmits the indication signal and the steering signal through the wireless communication module 512 to the portable device 6 for use in subsequent calculations performed by the portable device 6.

Figure 6:
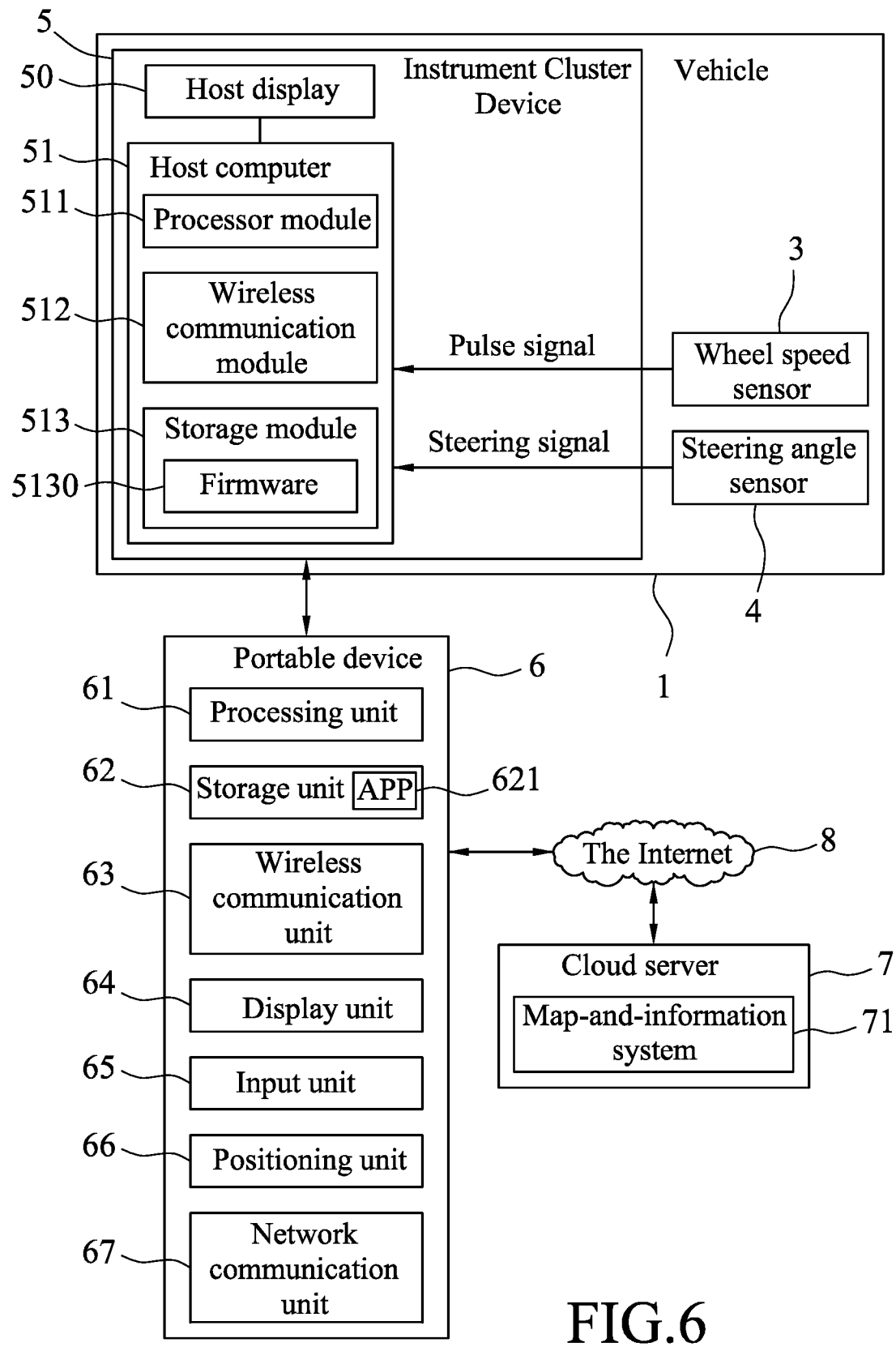
FIG. 6 is a schematic block diagram of still another modification of the navigation system according to one embodiment of the present disclosure.

Referring to FIG. 6, still another modification of the navigation system is shown. In this example, the instrument cluster device 5 only includes the host display 50 and the host computer 51, while the dashboard 52 and the dashboard controller 53 shown in FIGS. 1, 4 and 5 are omitted. In this example, the host computer 51 is capable of performing functions performed by the dashboard controller 53, and the host display 50 is capable of displaying controls and instrument cluster information of the vehicle 1 otherwise displayed by the dashboard 52. The host computer 51 is electrically connected to the wheel speed sensor 3 for receiving the pulse signals therefrom, and is electrically connected to the steering angle sensor 4 for receiving the steering signal therefrom to thereby perform subsequent calculations.

To sum up, by virtue of cooperation among the portable device 6, the instrument cluster device 5 of the vehicle 1, the wheel speed sensor 3 and the steering angle sensor 4, the movement estimation for the vehicle 1 can have a precision down to one meter. In this way, the present disclosure provides a relatively accurate and/or precise navigation system and navigation method as compared to conventional positioning techniques such as GPS that have a precision ranging from five meters to twenty meters.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A navigation method to be implemented by a portable device and a vehicle, the vehicle including a wheel speed sensor, an instrument cluster device communicatively connected to the wheel speed sensor and the portable device, a handgrip, and a steering angle sensor mounted on the handgrip and electrically connected to the instrument cluster device, the navigation method comprising steps of:

repeatedly emitting, by the wheel speed sensor, a pulse signal to the instrument cluster device when the vehicle starts to travel from a start point of a navigation route on a navigation map;

in response to receipt of a preset number of the pulse signals, transmitting, by the instrument cluster device, an indication signal associated with the preset number of the pulse signals to the portable device;

emitting, by the steering angle sensor to the instrument cluster device, a steering signal related to a steering angle of the handgrip, emitting, by the instrument cluster device, the steering signal to the portable device;

upon receipt of the indication signal, calculating, by the portable device, a current position of the vehicle on the navigation map based on the steering signal and a predetermined distance that is related to the preset number of the pulse signals;

transmitting, by the portable device, data of the navigation map having the current position of the vehicle and the navigation route to the instrument cluster device; and in response to receipt of the data, displaying, by the instrument cluster device, the navigation map having the current position of the vehicle and the navigation route.

2. The navigation method as claimed in claim 1, wherein, in the step of calculating a current position of the vehicle on the navigation map, the predetermined distance is one meter.

3. The method as claimed in claim 1, wherein the step of emitting a steering signal includes emitting the steering signal according to an acceleration of the handgrip.

4. A navigation system for navigating a vehicle including a handgrip, comprising:

a portable device;

a wheel speed sensor configured to be mounted on the vehicle and to repeatedly emit a pulse signal when the vehicle starts to travel from a start point of a navigation route on a navigation map;

an instrument cluster device configured to be mounted on the vehicle, communicatively connected to said portable device, electrically connected to said wheel speed sensor for receiving the pulse signals therefrom, and configured to, in response to receipt of a preset number of the pulse signals, transmit an indication signal associated with the preset number of the pulse signals to said portable device;

a steering angle sensor to be mounted on the handgrip, electrically connected to said instrument cluster device, and configured to transmit a steering signal related to a steering angle of the handgrip to said instrument cluster device, wherein said portable device is configured to, upon receipt of the indication signal, calculate a current position of the vehicle on the navigation map based on a predetermined distance that is related to the preset number of the pulse signals and the steering signal, and to transmit data of the navigation map having the current position of the vehicle and the navigation route to said instrument cluster device, wherein said instrument cluster device is further configured to, in response to receipt of the data, display the navigation map having the current position of the vehicle and the navigation route.

5. The navigation system as claimed in claim 4, wherein the predetermined distance is one meter.

6. The navigation system as claimed in claim 4, wherein said steering angle sensor is an accelerator for detecting acceleration of the handgrip.

7. The navigation system as claimed in claim 4, wherein said instrument cluster device includes a dashboard controller electrically connected to said wheel speed sensor for receiving the pulse signals therefrom, and a host computer electrically connected to said dashboard controller, wherein said steering angle sensor is electrically connected to said dashboard controller and said host computer for transmitting the steering signal to said dashboard controller and said host computer.

8. The navigation system as claimed in claim 4, wherein said instrument cluster device includes:

a dashboard controller electrically connected to said wheel speed sensor for receiving the pulse signals therefrom; and a host computer electrically connected to said dashboard controller and electrically connected to said steering angle sensor for receiving the steering signal therefrom.

9. The navigation system as claimed in claim 4, wherein said instrument cluster device includes:

a dashboard controller electrically connected to said wheel speed sensor for receiving the pulse signals and electrically connected to said steering angle sensor for receiving the steering signal therefrom; and a host computer electrically connected to said dashboard controller.

10. The navigation system as claimed in claim 4, wherein said instrument cluster device includes a host computer electrically connected to said wheel speed sensor for receiving the pulse signals and electrically connected to said steering angle sensor for receiving the steering signal therefrom.

* * * * *